(No Model.)
J. P. GALLAGHER.
STENCH TRAP.
No. 336,805. Patented Feb. 23, 1886.
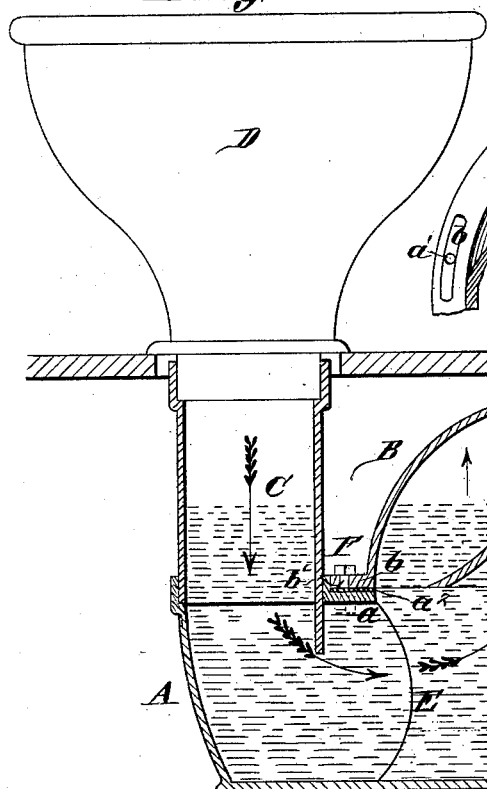
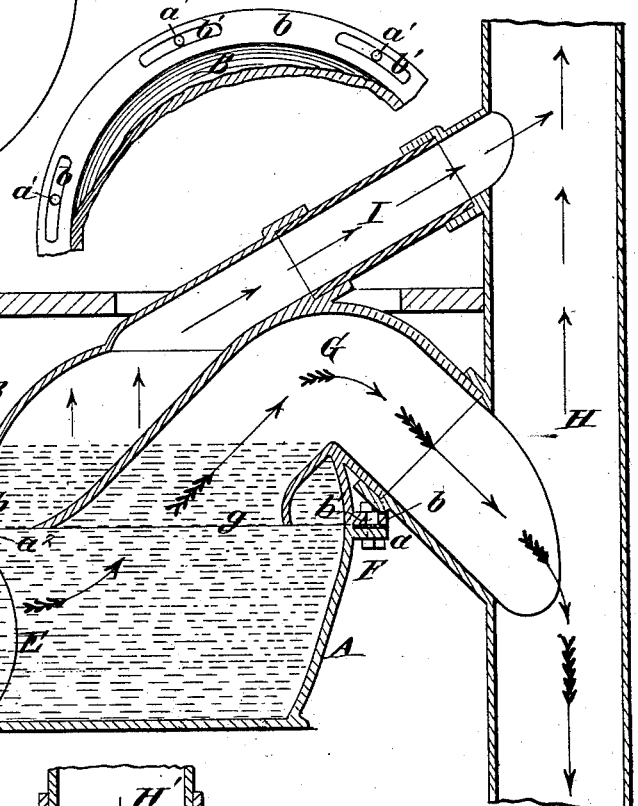
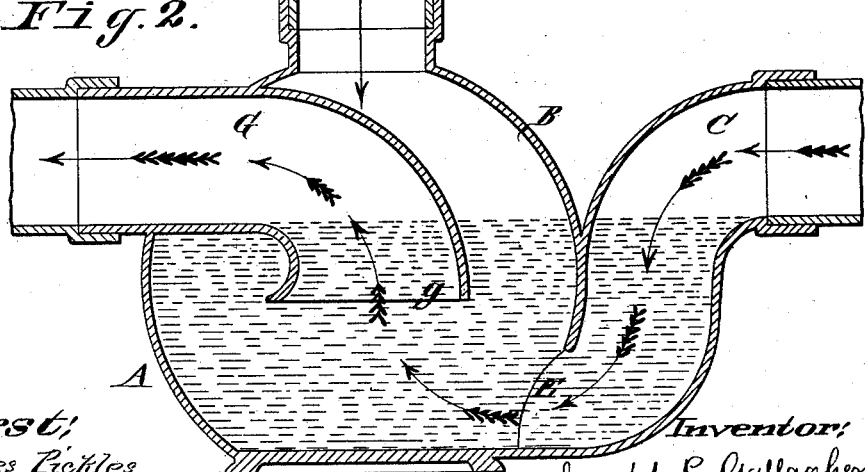
Attest:
Charles Pickles
F. A. Hopkins
Inventor:
Joseph P. Gallagher
By Knight Bros.
Attys.

UNITED STATES PATENT OFFICE.

JOSEPH P. GALLAGHER, OF ST. LOUIS, MISSOURI.

STENCH-TRAP.

SPECIFICATION forming part of Letters Patent No. 336,805, dated February 23, 1886.

Application filed November 11, 1885. Serial No. 182,448. (No model.)

*To all whom it may concern:*

Be it known that I, JOSEPH P. GALLAGHER, of the city of St. Louis, in the State of Missouri, have invented a certain new and useful Improvement in Stench-Traps, of which the following is a full, clear, and exact description, reference being had to the accompanying drawings, forming part of this specification, and in which—

Figure 1 is a vertical section illustrating the invention. Fig. 2 is a vertical section showing a modification. Fig. 3 is a detail section showing a part of the upper member of the trap shown in Fig. 1.

This invention consists in making the trap with a double seal; also, in details of construction set forth in the claims.

In Fig. 1 it is shown in connection with a water-closet basin, and in Fig. 2 in connection with a horizontal sewer, with a house or other pipe connecting therewith.

The main vessel or bowl A B may be made of metal, earthen-ware, or any other suitable material, and may be made in one piece, as seen in Fig. 2, or in two pieces, as seen in Fig. 1, or of more than two pieces.

I will first describe the device as shown in Fig. 1. A is the base, having at top a circular flange, $a$, and an inlet pipe or opening, C, which is shown in communication with the water-closet basin D. The induction, opening is in communication with the lower part of the trap-chamber through an opening, E. The cap B has a circular flange, $b$, which is secured by bolts F to the flange $a$. The bolts F pass through round holes $a'$ in the flange $a$, and through slots $b'$ in the flange $b$, the arrangement being such that the cap B may be fixed in any position upon the base A. If preferred, the slots may be made in the flange $a$, or in both $a$ and $b$. $a^2$ is a rubber gasket between the flanges. The cap has a siphon-pipe, G, through which the liquid contents of the trap-vessel A B is discharged, together with any matters that may be in the liquid. I prefer to make the discharge-pipe G with a flaring mouth, $g$, upon the inside, so that the soil and other matters contained within the trap may enter the pipe with more readiness. The bottom of the mouth $g$ is at a higher level than the top of the opening E, so that in case the water should be drawn out of the trap-vessel A B to the level of the bottom of the mouth $g$ the surface-level of the liquid in the trap will still be above the top of the opening E, and consequently the trap will be effectually sealed from sewer-gas from the soil-pipe H. The exit-pipe G being in form of a siphon, the liquid may be drawn by it from the trap until the water-level falls below the edge of the mouth $g$, and if it were not for the sealing of the mouth E of inlet-pipe C the sewer-gas would enter pipe C and find access to the house. As soon as the liquid is exhausted from the trap to the level of the mouth $g$, the air enters the mouth and the siphonic action of the pipe G on the liquid ceases. I is a vent-pipe, leading from the top of the trap-chamber to the soil-pipe, which is sufficient to extend through the roof, the vent-pipe inclining upward into the soil-pipe to prevent the sewer-gas entering the trap from the soil-pipe H.

In Fig. 2, H' is a sink, rain, or other pipe discharging into the trap which is in a sewer of which the trap inlet-pipe C and exit-pipe G form a part. In this figure the trap is formed in one piece. It may be made in this way of stoneware or cast in metal. These traps may be built of brick and cement, and made of very considerable size for use in large sewers, or may be made of very small size. They may be made in any number of pieces, so that the joints are made tight.

It will be observed that as the inlet-pipe enters the chamber at the lower part it will cleanse the bottom and wash up all matters to the mouth of the exit-pipe, so that no accumulation occurs there. As soon as the trap is flooded, the exit-pipe (see G, Fig. 1) will act as a siphon and suck up the impurities entering the chamber of the trap and discharge them into the soil-pipe, not allowing them to rise to the surface of the water in the trap. Thus the cause of pollution of the water is prevented.

No wind blowing down the soil-pipe and vent-pipe can enter the dwelling, as it cannot enter the mouth E of pipe C, such mouth being always flooded. The top, B, of the trap can be set in any position on the base A, so that the exit-pipe may discharge in any direction, except at the place occupied by the inlet-pipe C.

I claim—

1. In a stench-trap, the combination, with a bowl, of a siphonic discharge-pipe of less diameter than said bowl, projecting at one end thereinto, and an inlet-passage opening into said bowl below the receiving-mouth of the discharge-pipe. whereby a double seal is formed, substantially as set forth.

2. In a stench-trap, the combination of a bowl, a siphonic discharge-pipe of less diameter than said bowl, projecting thereinto and having a flaring mouth, and an inlet opening into said bowl below the mouth of said discharge-pipe, substantially as set forth.

3. In a stench-trap, the combination, with the base-section A, having the inlet-passage, of the upper section or cap, B, having a siphonic discharge-pipe, G, projecting at one end thereinto and formed integrally therewith, substantially as set forth.

4. In a stench-trap, the combination, with a bowl having a siphonic discharge-pipe projecting at one end thereinto, and an inlet-passage opening into the bowl below the mouth of the said discharge-pipe, whereby both are sealed, substantially as set forth, of a vent-pipe opening into the bowl between the said seals, for the purpose described.

JOSEPH P. GALLAGHER.

In presence of—
BENJN. A. KNIGHT,
JOSEPH WAHLE.